United States Patent [19]
Storer, Jr.

[11] 3,877,321
[45] Apr. 15, 1975

[54] TRANSMISSION HAVING HYDRAULIC PRELOAD MOTOR FOR AXIALLY POSITIONING BRAKE COMPONENTS

[75] Inventor: John E. Storer, Jr., Indianapolis, Ind.

[73] Assignee: General Motors Corporation, Detroit, Mich.

[22] Filed: Oct. 23, 1973

[21] Appl. No.: 408,466

[52] U.S. Cl. ............... 74/768; 188/71.1; 188/71.5; 188/72.4; 192/85 AA; 192/70.28
[51] Int. Cl. ... F16d 55/00; F16d 55/18; F16d 13/28
[58] Field of Search ....... 188/71.1, 71.5, 72.4, 72.5, 188/366; 192/85 AA, 87.15, 70.28; 74/768, 769

[56] References Cited
UNITED STATES PATENTS

| | | | |
|---|---|---|---|
| 2,890,769 | 6/1959 | Hause | 188/71.5 X |
| 2,914,140 | 11/1959 | Werner | 188/366 X |
| 3,747,729 | 7/1973 | Storer, Jr. | 192/70.28 |
| 3,765,519 | 10/1973 | Kell | 188/72.4 X |
| 3,773,148 | 11/1973 | Jean-Claude et al. | 188/72.4 |

Primary Examiner—Samuel Scott
Assistant Examiner—P. S. Lall
Attorney, Agent, or Firm—Charles R. White

[57] ABSTRACT

A transmission having axially arranged multi-plate friction brakes which are selectively engaged by hydraulically actuated pistons. A hydraulically actuated preload motor provides a positive axial clamp on stacked brake piston housings and brake anchor means to eliminate or substantially reduce any axial play between these brake components during transmission operation.

5 Claims, 3 Drawing Figures

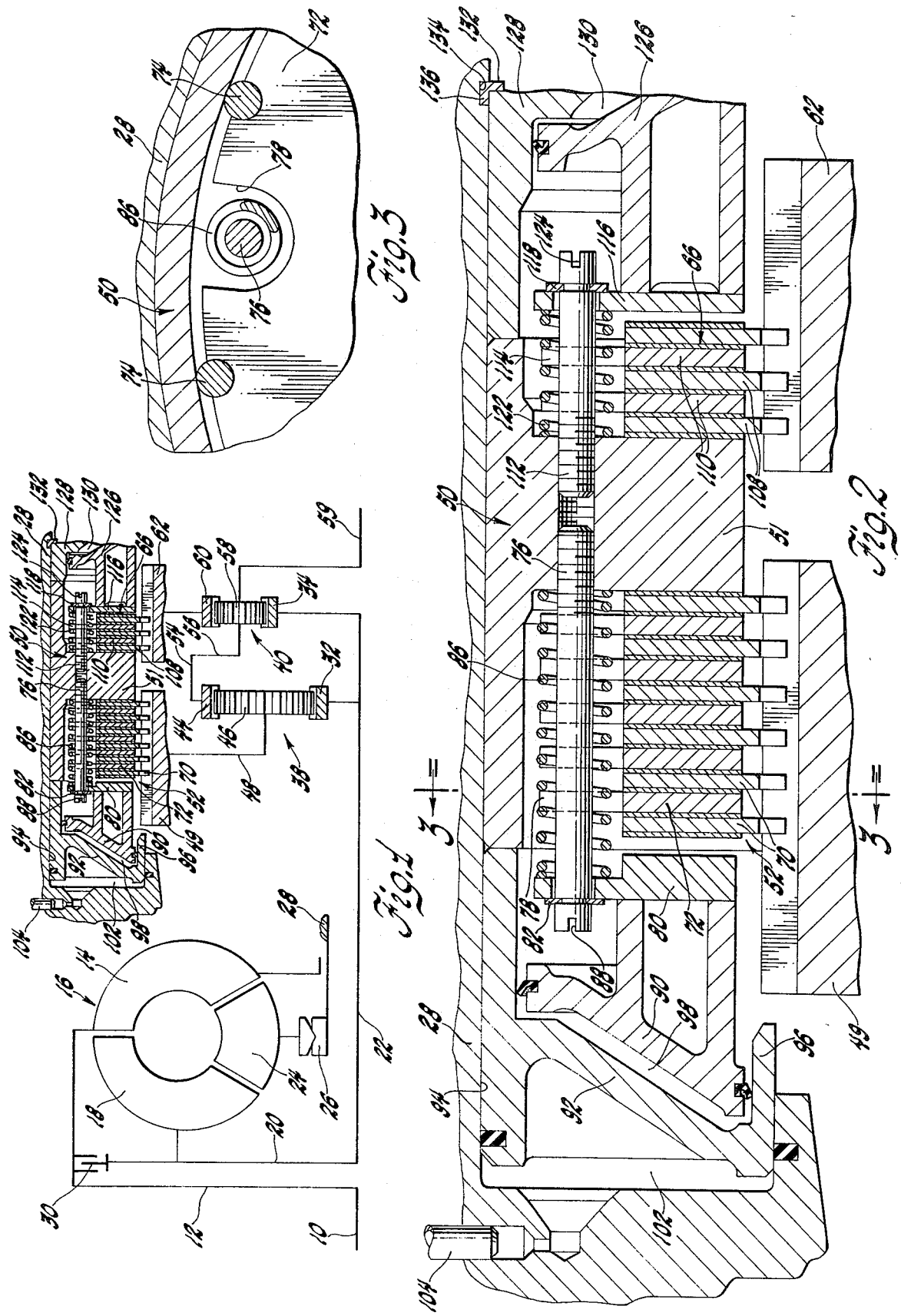

TRANSMISSION HAVING HYDRAULIC PRELOAD MOTOR FOR AXIALLY POSITIONING BRAKE COMPONENTS

This invention relates to transmissions and more particularly to a transmission having a hydraulically operated preload motor providing an axial clamping force on stacked anchor and brake piston housing means to automatically take up clearances therebetween and hold these brake components in fixed position.

Prior to the present invention some transmissions were constructed with brake structures such as the brake anchors and piston housings axially stacked in transmission cases. To position and hold these brake components in a transmission case and prevent their axial play during transmission operation, mechanical devices such as crush rings and threaded fasteners were employed. Many transmission designs required close tolerance control of the piston housing and anchors in the stackup to minimize this axial play. While close tolerance control and supplemental mechanical means for positioning these brake components to reduce axial play are generally satisfactory, transmission costs were thereby increased and assembly and disassembly of the brake components was often tedious and difficult. Additionally, if the parts or components wore during transmission operation, resulting axial play between the brake components detracted from transmission shift quality and overall transmission operation.

With the present invention there is a hydraulically operated preload motor that provides a positive axial clamping force for axially aligned brake piston housings and anchor means to hold these components in a fixed stacked position. With this construction axial motion between these stacked components, which otherwise would result from the selective application and release of the brakes, is eliminated or minimized. This hydraulically actuated preload motor construction eliminates the need for prior art threaded fasteners, crush rings, springs and other mechanical devices. This invention further allows the brake component parts to be built with a wide range of tolerance variation. With this invention parts attrition due to wear is minimized, but even if some wear occurs, the preload will automatically take up clearance without reduction of the preload force. Assembly and disassembly is easier as compared to mechanical clamping systems. Trapped snap ring construction for grounding of the preload force is possible with this invention. One or more brake piston housings and anchors can be stacked between the hydraulic preload motor and the grounding snap ring or other grounding device so that all brake components are positioned by the preload motor in a fixed position.

In the preferred embodiment of this invention a hydraulically operated preload motor, comprising a piston disposed in a large cylinder formed in a transmission casing, urges axially stacked brake anchor means and brake piston housing means to a position determined by stop means in the casing. This stop means is preferably a snap ring, L-shaped in cross section, which cannot be rolled out of its groove since the lip of the snap ring is trapped between the transmission case and brake piston housing means. The preload motor further serves as a housing for a brake piston so that maximum utilization of the preload motor and available space is obtained.

These and other features, advantages and objects of this invention will become more apparent from the following detailed description and drawings in which:

FIG. 1 is a diagrammatic view of a torque converter transmission;

FIG. 2 is an enlarged elevational view of a portion of the transmission of FIG. 1 illustrating the friction brakes and brake components employed therein; and FIG. 3 is a sectional view taken along lines 3—3 of FIG. 2.

Referring to the drawings there is shown in FIG. 1 a transmission having an input shaft 10 drivingly connected through a hub 12 to an impeller 14 of a torque converter 16. The torque converter has a turbine 18 drivingly connected through a hub 20 to a turbine shaft 22 and further has a stator 24 operatively connected through a one-way device 26 to the transmission case 28. A conventional lockup clutch 30, operatively connected between the hubs 12 and 20, is selectively engageable to permit lockup of the torque converter 16.

The turbine shaft 22 is drivingly connected to two sun gears 32 and 34 which are components of planetary gear sets 38 and 40, respectively. The planetary gear set 38 has a ring gear 44 and a plurality of planet pinions 46 meshing with the sun gear 32 and the ring gear 44. Planet pinions 46 are rotatably mounted on a carrier 48, drivingly connected to an annular splined hub 49, which is selectively connectable to a cylindrical anchor 50 through a multi-plate friction brake 52. The cylindrical anchor 50 is secured by splines or keys to the interior wall of the case 28 so that the anchor can slide axially but cannot rotate. The anchor has a central backing flange 51 that extends radially inwardly to serve as a backing member for the selectively engageable friction devices of the transmission such as brake 52.

The ring gear 44 of planetary gear set 38 is connected by a drum 54 to a carrier 56 for the planet pinions 58 of planetary gear set 40. The planet pinions 58 are rotatably mounted on the carrier 56 and mesh with sun gear 34 and a ring gear 60. The ring gear 60 is drivingly connected to a annular splined hub 62 which may be selectively connected to the anchor 50 through a multi-plate friction brake 66. The carrier 56 is drivingly connected to a shaft 59 which represents an output of the transmission.

The transmission illustrated in FIG. 1 is operable through the planetary gear sets 38 and 40 and the disc brakes 52 and 66 to provide a forward speed and a reverse speed. The planetary gear set 40 is operable, when brake 66 is engaged, to provide a forward reduction drive ratio. The planetary gear set 38 is operable, when brake 52 is engaged, to provide a reverse drive ratio. The forward and reverse drive ratio may be combined with additional gearing such as provided in my prior U.S. Pat. No. 3,747,729, issued July 24, 1973, for Friction Drive Establishing Device Clearance Control Mechanism to provide six forward speeds and three reverse speeds if desired.

Referring to FIG. 2 there is shown an enlarged sectional view of disc brakes 52 and 66. The disc brake 52 includes a plurality of operatively spaced friction plates 70 interleaved with steel plates 72. The friction plates 70 are splined to the hub 49 and the steel plates 72 are drivingly connected to the anchor 50 through a plurality of pins 74 which prevent relative rotation between the anchor 50 and the steel plates 72, while allowing axial movement of the steel plates toward and away from the backing flange 51. A plurality of screws 76 extend through peripheral openings 78 in the steel plates 72 and are threaded into the backing flange 51. A pressure plate 80 is also mounted on the screws 76 which carry a stop member such as a snap ring 82 that limits the leftward movement of the pressure plate 80. The pressure plate 80 is urged to the left by a plurality of compression springs 86 which are disposed around screws 76 and which also extend through the peripheral openings 78 in the steel plate 72 into engagement with backing flange 51. The screws 76 have a screwdriver bit slot 88 at one end thereof which permits the screws to be adjusted in the anchor member 50. The installation and free running clearance adjustment of the preadjusted multi plate brakes of this transmission is the same as that of my prior patent, identified above, and further description of this feature is therefore unnecessary.

The pressure plate 80 is abutted by fluid operated piston 90 which is slidably disposed within a hydraulically operated preload motor 92 having a larger effective area than piston 90 slidably mounted for axial movement in the large cylinder or bore provided between the inner cylindrical wall 94 of the casing and a spaced annular shoulder 96. Piston 90 is operated on by fluid pressure fed to a chamber 98 formed between the piston 90 and the preload motor 92 from hydraulic controls and fluid passage means not illustrated. When pressure is exhausted from chamber 98 springs 86 stroke pressure plate 80 and piston 90 to the off position.

A fluid chamber 102 is formed between the preload motor 92 and the casing 28 which is connected to main line pressure of the controls by passage 104. The preload motor has a larger effective area than the piston for the brake 52 and is acted upon by main line pressure which is as large as or larger than the maximum pressure used to stroke and fully apply the piston 90 so that the preload motor is continuously urged to the right when the engine is running regardless of the pressure conditions in chamber 98. As shown in the drawings the preload motor 92 abuts against one end of the cylindrical anchor 50 and, when chamber 102 is pressurized by line pressure, exerts an axial force on anchor 50 to take up clearances between the anchor and other brake components as will be further explained below.

The friction brake 66 is similar in construction to the friction brake 52. This brake has a plurality of friction faced plates 108 splined to hub 62 interleaved with steel plates 110 which are drivingly connected to the anchor member 50. A plurality of axially extending pins, not shown, similar to pins 74 of FIG. 3 are preferably employed to make this connection. A plurality of screws 112 extend through peripheral openings 114 in the steel plates and are threaded into the backing flange 51 of anchor 50. A pressure plate 116 is mounted on the screws 112 and is disposed against a stop member such as snap ring 118 that limits the rightward movement of the pressure plate 116. The pressure plate 116 is urged to the right by a plurality of compression springs 122 which are disposed around screws 112 and which extend through the openings in the steel plates. These screws 112 have screwdriver bit slots 124 at one end thereof which permits the screws to be adjusted in the anchor 50.

The pressure plate 116 is abutted by a fluid operated piston 126 having an effective area smaller than that of preload motor 92 slidably disposed within a cylindrical piston housing 128. The piston 126 and housing 128 cooperate to form a pressure chamber 130 operatively connected to the hydraulic controls so that the piston will be stroked to apply brake 66 when chamber 130 is pressurized. When the pressure is exhausted from chamber 130 the springs 122 will stroke the pressure plate 116 and piston 126 to the off position. The piston housing 128 is secured against axial movement to the right relative to the casing 28 by a snap ring 132 disposed in an annular groove 134 formed in the transmission case. This snap ring is preferably L-shaped in cross-section so that its axially extending lip 136 bears against the outer circumference of the housing 128 and cannot roll out when the piston housing 128 is urged to the right.

In the preferred operation of this invention the chamber 102 of the preload motor 92 is charged with main line pressure when the vehicle motor is running so that the preload motor urges the anchor 50 to the right into engagement with the piston housing 128 which is in turn urged against the radially extending leg of the snap ring 132 when either piston 90 or 126 is stroked. Hydraulic preload takes up all clearances between the stacked component and eliminates the need for precision parts held to close tolerances, mechanical screws or other type mechanical fasteners which would otherwise be needed to hold these parts in close contact. The preload force exerted always exceeds the individual apply forces of pistons 90 and 126. Thus, when the piston apply chambers 98 or 130 are subsequently pressurized by applied pressure from the controls to stroke the respective pistons 90 or 126, the preload motor exerts its positive clamping force on anchor 50 which is transmitted to the snap ring by the piston housing 128. With the preload force holding the anchor 50 and piston housing 128 in position against the snap ring, axial movement and mechanical wear of these parts resulting from the apply and release of brakes 52 and 66 are eliminated or substantially reduced. In the event that wear occurs between the contacting portions of the preload motor 92, anchor 50 and housing 128, the load exerted by the preload motor is not reduced as would be the case with mechanical fasteners and the wear clearance is taken up. Assembly and disassembly of these parts is facilitated as compared to mechanical crush rings, springs and other fasteners which are tedious to install, adjust and remove. The initial assembly is readily accomplished by installing the preload motor and the nested piston 90 in position. The anchor 50 and brakes 52 and 66 are installed followed by piston 126, piston housing 128 and force-grounding snap ring 132. If it is desired to remove the snap ring 132 from the piston housing 128, anchor 50 and preload motor 92 can be readily displaced to the left out of engagement with the lip of the snap ring when the preload chamber is exhausted. Once the snap ring lip does not contact the piston housing 128 it can be contracted and removed so that housing 128, anchor 50 and other components can be removed.

For the sake of simplicity, this invention has been described for use with back to back brake structures. However, the components of one or a plurality of brakes can be stacked between the preload motor and the shoulder provided by the snap ring. Thus, one hydraulic preload device can serve to axially locate the stationary components of one or more brake units. In the construction of this invention each individual piston is correspondingly sized and pressurized to generate less axial force than does the preload motor. Furthermore, if the transmission has two or more brake units which are required to be simultaneously engaged, no axial force is generated by the brake pistons which will overcome the preload motor force so that the hydraulic clamping remains fully effective to meet the design objectives of this invention. Since the preload motor holds the anchor and other associated components in loaded engagement with the snap ring at all times for all brake apply piston loads, cyclic load variation transmitted to the trapped snap ring and the transmission case is minimized. This reduces fatigue and attrition on the thrust load components to increase their service life.

While this invention has been shown in a transmission having preadjusted multi-plate brake units, it can be readily employed with transmission having stacked friction units without the preadjustment features.

While a preferred embodiment of this invention has been shown and described in detail to illustrate the invention, various changes and modifications may be made without departing from the scope of the invention set forth in the following claims.

I claim:

1. A transmission having input and output means, a gear unit operatively connecting said input means to said output means, a casing for said transmission, friction brake means disposed in said housing operatively connected to said gear unit and selectively engageable to condition said gear unit for a predetermined input/output speed ratio, anchor means for said brake means, said anchor means having a radially extending backing flange behind said friction brake means, means mounting said anchor means for limited axial movement in said casing, stop means operatively connected to said casing for limiting the axial sliding movement of said anchor means, piston means for selectively engaging said friction brake means and hydraulically actuated preload motor means mounted in said casing for urging said anchor means into engagement with said stop means so that said piston means can effect the subsequent engagement of said brake means without movement of said anchor means.

2. The transmission defined in claim 1 wherein said preload motor means comprises a hydraulically operated preload piston, said casing having a cylinder for said preload piston, fluid conducting means for supplying a fluid pressure to said cylinder so that said preload motor urges said anchor means against said stop means, a pressure chamber for said piston means and additional fluid conducting means for supplying a fluid pressure to said chamber for stroking said piston means while said preload piston is clamping said anchor to said stop means.

3. A transmission having an input and an output, a casing for said transmission, gear means operatively disposed in said casing operatively connecting said input and said output, selectively engageable friction means operatively connected to said gear means for conditioning said gear means for a predetermined input/output speed ratio, anchor means in said casing, said anchor means having an inwardly extending backing flange operatively disposed adjacent to one side of said friction means, stop means in said casing adjacent to one side of said anchor means, a hydraulically operated preload motor operatively disposed in said casing adjacent to the other end of said anchor means, means for supplying pressure to said preload motor so that said preload motor exerts an axial clamping force upon said anchor means to thereby urge said anchor means into engagement with said stop means, and hydraulically operated piston means operatively disposed in said preload motor for selectively engaging said friction means to condition said gear means for said predetermined input/output speed ratio.

4. A transmission having an input and an output, a casing for said transmission, gear means in said casing operatively connecting said input and said output, separate selectively engageable friction means operatively connected to said gear means for conditioning said gear means for predetermined input/output speed ratios, a first hydraulically operated piston for one of said friction means, a housing operatively disposed in said casing for said first piston, anchor means mounted in said casing, said anchor means having a central backing flange operatively disposed between said separate friction means, stop means in said casing adjacent to one end of said housing, hydraulically operated preload motor means aligned with one end of said anchor means operatively disposed in said casing, means for supplying a fluid pressure to said prelaod motor so that said preload motor exerts an axial force on said anchor means and said housing for clamping said anchor means and said housing between said preload motor and said stop means, and a second hydraulically operated piston means operatively disposed in said preload motor for engaging another of said friction means.

5. The transmission defined in claim 4 wherein said casing has a groove therein and said stop means is a snap ring disposed in said groove having an axially extending lip disposed against the periphery of said housing for said first piston.

* * * * *